United States Patent
Lee

(10) Patent No.: US 9,367,545 B2
(45) Date of Patent: Jun. 14, 2016

(54) APPARATUS FOR PROVIDING DIGITAL CONTENT AND METHOD THEREOF

(75) Inventor: Woo-yong Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 453 days.

(21) Appl. No.: 13/087,751

(22) Filed: Apr. 15, 2011

(65) Prior Publication Data

US 2011/0255614 A1 Oct. 20, 2011

(30) Foreign Application Priority Data

Apr. 15, 2010 (KR) .................. 10-2010-0034856

(51) Int. Cl.
*H04L 27/00* (2006.01)
*G06F 17/30* (2006.01)

(52) U.S. Cl.
CPC .............. *G06F 17/30032* (2013.01)

(58) Field of Classification Search
CPC .................................... G06F 17/30032
USPC ........................................ 375/259
See application file for complete search history.

(56) References Cited

U.S. PATENT DOCUMENTS

| | | | | |
|---|---|---|---|---|
| 4,503,291 | A * | 3/1985 | von Holten et al. | 379/357.04 |
| 5,457,369 | A * | 10/1995 | Matsumura et al. | 318/569 |
| 6,643,643 | B1 | 11/2003 | Lee et al. | |
| 6,665,635 | B2 * | 12/2003 | Shimizu et al. | 702/188 |
| 8,870,655 | B2 * | 10/2014 | Ikeda | 463/39 |
| 2004/0064526 | A1 * | 4/2004 | Lee et al. | 709/217 |
| 2005/0225453 | A1 | 10/2005 | Chang et al. | |
| 2006/0243120 | A1 | 11/2006 | Takai et al. | |
| 2006/0263068 | A1 | 11/2006 | Jung | |
| 2008/0235621 | A1 | 9/2008 | Boillot | |
| 2009/0247222 | A1 * | 10/2009 | Bonnat | 455/557 |
| 2012/0008701 | A1 * | 1/2012 | Buchwald et al. | 375/259 |
| 2012/0230234 | A1 * | 9/2012 | Kim | 370/310 |

FOREIGN PATENT DOCUMENTS

| | | |
|---|---|---|
| CN | 1293793 | 5/2001 |
| CN | 1862539 | 11/2006 |
| EP | 1 705 588 | 9/2006 |
| GB | 2 394 343 | 4/2004 |
| JP | 2006-302490 | 11/2006 |
| JP | 2006-323690 | 11/2006 |
| KR | 1020050058877 | 6/2005 |
| KR | 1020050099585 | 10/2005 |
| KR | 1020060103161 | 9/2006 |
| KR | 1020090076540 | 7/2009 |
| WO | WO 2006/086439 | 8/2006 |

OTHER PUBLICATIONS

Chinese Office Action dated Mar. 24, 2015 issued in counterpart application No. 201180018639.7.
Korean Office Action dated Jan. 20, 2016 issued in counterpart application No. 10-2010-0034856, 9 pages.
Chinese Office Action dated Mar. 21, 2016 issued in counterpart application No. 201180018639.7, 11 pages.

* cited by examiner

*Primary Examiner* — Santiago Garcia
(74) *Attorney, Agent, or Firm* — The Farrell Law Firm, P.C.

(57) ABSTRACT

An apparatus for providing content operable in association with an input apparatus, and a method thereof are provided. According to the apparatus and method, a control signal corresponding to an action of a user is received from an input apparatus associated with the content, a content associated with the input apparatus based on the received control signal is searched, and the searched content is provided.

25 Claims, 6 Drawing Sheets

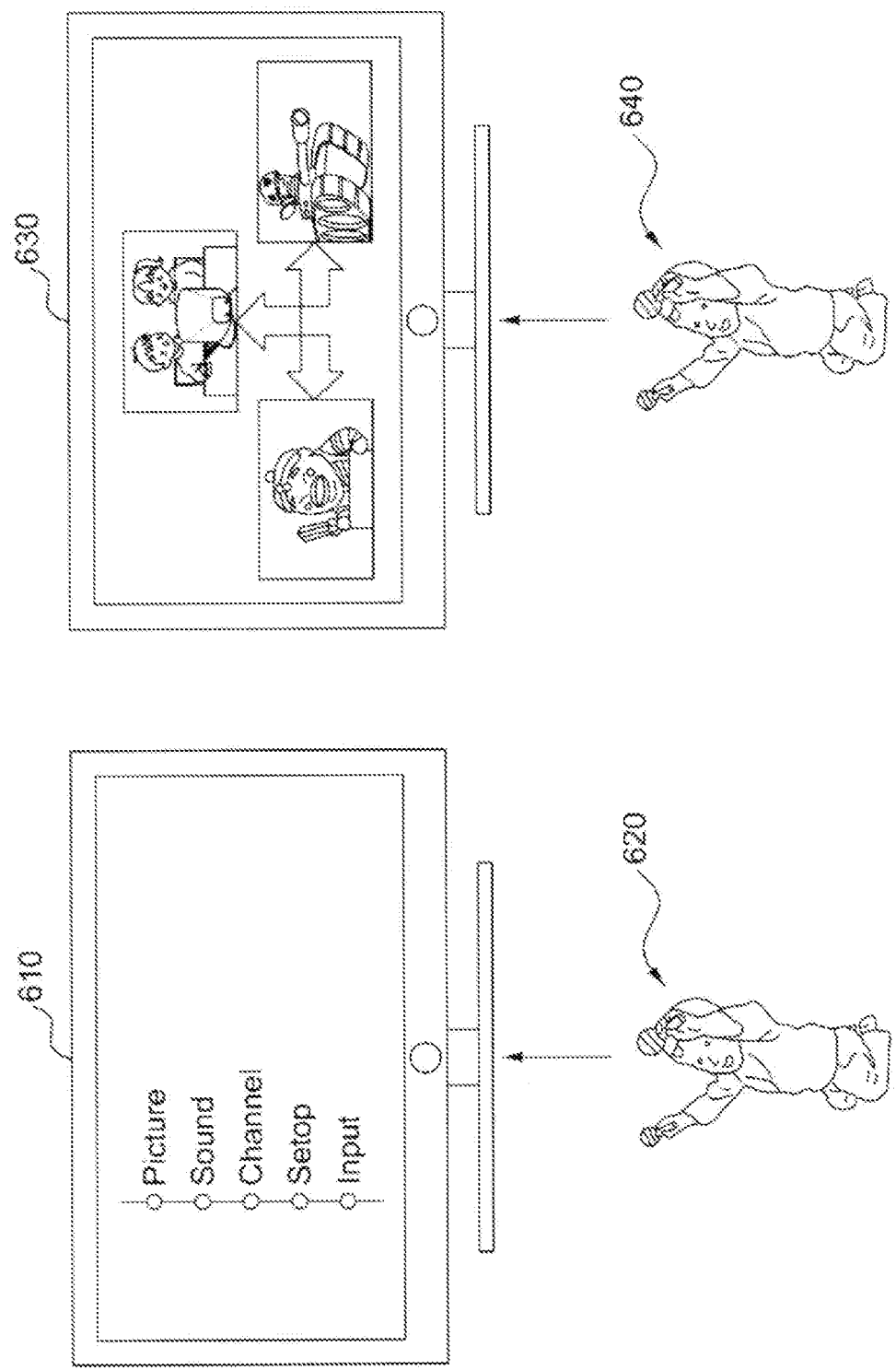

APPARATUS FOR PROVIDING DIGITAL CONTENT AND METHOD THEREOF

PRIORITY

This application claims priority under 35 U.S.C §119(a) to a Korean Patent Application No. 10-2010-0034856, filed on Apr. 15, 2010, in the Korean Intellectual Property Office, the entire disclosure of which is incorporated herein by reference.

BACKGROUND

1. Field of the Invention

The present invention relates generally to providing digital content, and more particularly, to an apparatus for providing digital content and a method thereof.

2. Description of the Related Art

To execute digital content, a user generally accesses the intended digital content of a storage unit of a digital content providing apparatus via interface. The user then plays back the accessed digital content by executing content controller module related to the accessed digital content.

The digital content providing apparatus may provide the user with a menu categorized in relation to the content so as to assist the user in accessing the digital content. The user selects categories relates to the digital content sequentially in accordance with a hierarchy through a display of the digital content providing apparatus. The user then selects digital content from a lowest-level digital content list and has one or more digital content played back.

SUMMARY

Accordingly, the present invention has been made to solve the above-mentioned problems occurring in the prior art.

According to one embodiment, a goal is to provide a display apparatus and a motion control method thereof, which improve accuracy of motion recognition.

In one embodiment, a method for providing a digital content of an apparatus for providing digital content is provided, which includes receiving a control signal corresponding to an action of a user from an input apparatus associated with the content, searching a content associated with the input apparatus based on the received control signal, and providing the searched content.

The method may additionally include receiving a control signal corresponding to a selection of at least one content from the content list.

The method may additionally include displaying at least one of the provided content and information related to the content.

In another embodiment, a method for providing digital content is provided, which includes receiving, at a first apparatus, a control signal corresponding to an action of a user from an input apparatus associated with the content, searching a second apparatus operable in association with the input apparatus based on the received control signal, and transmitting the control signal to the searched second apparatus.

In another embodiment, an apparatus for providing digital content is provided, which includes a communication unit which receives a control signal corresponding to an action of a user from an input apparatus associated with the content, a control unit which searches a content associated with the input apparatus based on the received control signal, and an output unit which provides the searched content.

The apparatus may additionally include a display which displays at least one of the provided content and information related to the content.

In another embodiment, an apparatus for providing digital content is provided, which includes a communication unit which receives a control signal corresponding to an action of a user from an input apparatus associated with the content, a control unit which searches an external apparatus operable in association with the input apparatus based on the received control signal, and a transmitting unit which transmits the control signal to the searched second apparatus.

BRIEF DESCRIPTION OF THE DRAWINGS

The above and/or other aspects of the present invention will be more apparent by describing certain embodiments of the present invention with reference to the accompanying drawings, in which:

FIG. 6 illustrates another example of operating a digital content providing apparatus according to an embodiment of the present invention.

DETAILED DESCRIPTION OF EMBODIMENTS OF THE PRESENT INVENTION

Figure 1:
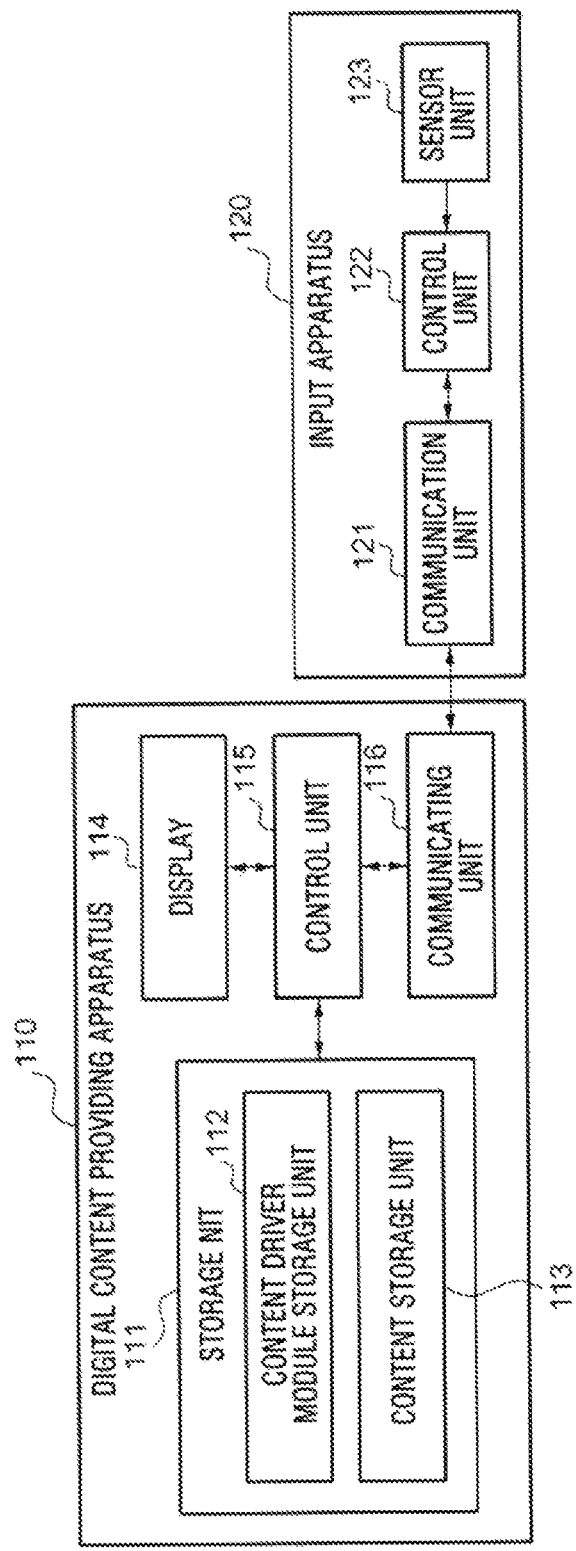
FIG. 1 is a block diagram illustrating a digital content providing system according to an embodiment of the present invention.

Certain embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Accordingly, it is apparent that the embodiments of the present invention can be carried out without those specifically defined matters. Further, well-known functions or constructions are not described in detail since they would tend to obscure the invention.

An apparatus for providing digital content, according to an embodiment of the present invention, receives identifier information of an input apparatus and a control signal regarding an action of a user utilizing the input apparatus associated with the content. The apparatus for providing digital content according to an embodiment operates a content control module based on the input control signal, and provides the content associated with the input apparatus through a display. Thus, the digital content from the apparatus providing the digital content is executed by the input apparatus. The digital content, according to an embodiment of the present invention, also provides an access point that a child or a senior citizen can use conveniently. The access point refers to a screen state that a user can operate content by utilizing the input apparatus.

FIG. 1 is a block diagram illustrating a digital content providing system according to an embodiment of the present invention.

The system for providing digital content includes a digital content providing apparatus 110 and an input apparatus 120.

Referring to FIG. 1, the digital content providing apparatus 110 includes a storage unit 111, a display 114, a control unit 115, and a communication unit 116.

The display 114 receives and displays video signals. The display may be implemented as a digital light processing display, a Liquid Crystal Display (LCD), or a plasma display panel, but not limited to the above examples only.

The control unit 115 controls the digital content providing apparatus 110, and operates functions providing digital content. The control unit 115 may include an Arithmetic Logic Unit (ALU) for calculating and a register for temporarily storing data or compilers.

The control unit 115 searches the storage unit 111 for content associated with the input apparatus 120 based on control signal corresponding to an action of a user received from the input apparatus 120. The content associated with the input apparatus 120 refers to content which may be executed by the user's specific action and controlled by the user's specific action detectable by the input apparatus 120.

The control unit 115 may also search the storage unit 111 for a content control module necessary for executing the content associated with the input apparatus 120. The control unit 115 may control the content regarding the content control module by executing the searched content control module. Meanwhile, the control unit 115 may close the content control module having no relation with the content associated with the input apparatus 120, Digital TeleVision (DTV) driver module, or part of the module included in the digital content providing apparatus.

As used herein, the term "module" may be a software or a hardware element such as a Field-Programmable Gate Array (FPGA) and Application-Specific Integrated Circuit (ASIC). However, the module may not be limited to software or hardware only. The module may be constructed for recording in the storage medium to be addressed, or to play back one or more processors. Thus, the module may include, for example, software elements, object-oriented software elements, class elements and task elements, or processes, functions, attributes, procedures, subroutines, segments of program codes, drivers, firmware, microcodes, circuits, data, database, data structures, tables, arrays, and variables. The elements and modules may provide functions combining a smaller number of elements and modules, or separating additional elements and modules. Further, the elements and modules may be implemented to play back one or more Central Processing Units (CPUs) in the input apparatus or security multimedia card.

A user input unit (not illustrated) may be provided to be operated by a user in the digital content providing apparatus 110, and may transmit a user's operation information to the control unit 115 so that a user can control operations of the digital content providing apparatus 110. The user input unit may include menu keys set provided outside the digital content providing apparatus 110, a touch pad, or a touch screen, but not limited to the above examples only.

The storage unit 111 may include a content control module storage unit 112 and a content storage unit 113. The storage unit 111 may be a module inputting and outputting information, including, for example, a hard disk, a flash memory, a compact flash card, a secure digital card, a smart media card, a multimedia card, or a memory stick, which may be included in the digital content providing apparatus 110, or included in a separate device, transmitting content or content modules in a wired or a wireless manner.

The content storage unit 113 may store a variety of content including games, broadcasting programs, videos, music, images, audios, scent information, gesture information, and applications, and not limited to the above example only.

The content control module storage unit 112 may store modules for executing the above content, and may correspond to types of content or the input apparatus. One content control module may correspond to one or more types of content or input apparatus.

The communication unit receives at least one of: the identifier information of the input apparatus 110 and a sensor value varied and measured at the input apparatus, an action of a user information acquired based on the sensor value, or apparatus control information acquired based on the action of a user information. The communication unit 116 may communicate with a communication unit 121 of the input apparatus 110 by utilizing Wireless LAN (WLAN), Bluetooth, Zigbee, Wireless Broadband (WiBro), Wireless Fidelity (Wi-Fi), or Universal Serial Bus (USB), but not limited to the above examples only.

The communication unit may receive a control signal corresponding to the action of a user transmitted from the input apparatus from an external device. The external device may be separated from the digital content providing apparatus and connected in wired or wireless manner. For example, the external device may be a set-top box, a gateway unit, a memory stick, a multimedia card and the like.

The external device may receive control signals in response to an action of a user from the input apparatus 110 and transmit the control signal to one or more communication units 116 of the digital content providing apparatus.

Referring to FIG. 1, the input apparatus 120 includes a communication unit 121, a control unit 122, and a sensor 123.

The communication unit 121 transmits at least one information from identifier information of the input apparatus 120 and the sensor value measured in the input apparatus, an action of a user information acquired based on the above sensor value and device control information acquired based on the above an action of a user information to the digital content providing apparatus 110. The communication unit 121 may communicate with the communication unit of the digital content providing apparatus 110 by utilizing Wireless LAN, Bluetooth, Zigbee, WeBro, Wi-Fi, and USB.

The sensing unit 113 senses sensor value regarding the action of a user using the input apparatus. The sensor may be a grip sensor, a touch sensor, a pressure sensor, a vibration sensor, a perfume sensor, a terrestrial magnetism sensor, or an acceleration sensor, sensing the sensor value, but not limited to the above examples only.

The sensing unit 113 senses chemical or physical variations of currents, voltage, heats, and resistance, converts the sensed signals to electric signals, and transmits the electric signals to the control unit 122.

The control unit 122 controls the overall operations of the input apparatus 120, and transmits at least one information from the sensor value measured by the sensor 123, the action of a user information acquired based on the sensor value, and device control information acquired based on the action of a user information to the digital content providing apparatus 110 through the communication unit 121.

The control unit 122 may also provide the identifier information of the input apparatus to the digital content providing apparatus 110. The identifier information of the input apparatus may distinguish the input apparatus from the other input apparatuses or may represent some of the functions of the input apparatus. The identifier information may be stored in the storage (not illustrated) provided in the input apparatus 120, or may be stored in another device.

The control unit determines the power status of the digital content providing apparatus. That is, if the digital content providing apparatus is off, the control unit may include a module to switch on the digital content providing apparatus. The module to switch on the digital content providing apparatus may be included in the digital content providing apparatus, to switch on the apparatus and execute the content module or the DTV driver module. The module to switch on the digital content providing apparatus may be provided outside the digital content providing apparatus. In this case, the external apparatus existing outside may search the digital content providing apparatus including the content associated with the input apparatus or the content control module. The external apparatus may then switch on the digital content providing apparatus and execute the content module or the DTV driver module.

Figure 2:
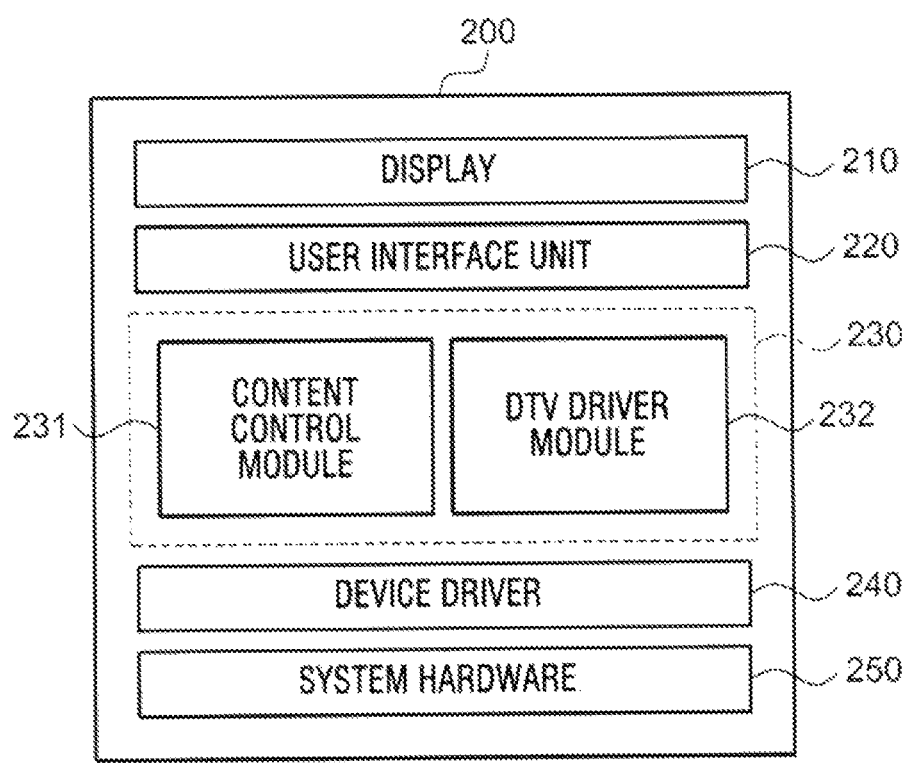
FIG. 2 illustrates a digital content providing apparatus according to another embodiment of the present invention.

FIG. 2 is a block diagram of the digital content providing apparatus 110 according to another embodiment of the present invention.

Referring to FIG. 2, the digital content providing apparatus 200 includes a system hardware 250, a device driver 240 controlling the system hardware, a DTV driver software 230 controlling the DTV, a user interface 220 providing a menu for controlling the operations of the digital content providing apparatus 200 and content, and a display 210.

The DTV driver software 230 may include a DTV driver module 232 for controlling the general functions of the DTV, and a content control module 231 for controlling content.

The DTV driver module 232 for controlling the general functions of the DTV may implement functions including an interface with the device driver 240 of the DTV, channel change, Electronic Program Guide (EPG) control, or On-Screen Display (OSD) control.

The DTV content control module 231 for providing the content may correspond to the content or the input apparatus. One content control module may correspond to one or more content or input apparatus types.

The digital content providing apparatus 200 may execute the content control module 231 corresponding to the input apparatus or the content by utilizing control signal responding to the action of a user received from the input apparatus. The content control module may correspond to a plurality of input apparatuses or contents. The digital content providing apparatus 200 may include a plurality of content control modules.

The digital content providing apparatus 200 may close other content control module or DTV driver module to execute the content control module corresponding to the plurality of input apparatuses or contents.

Figure 3:
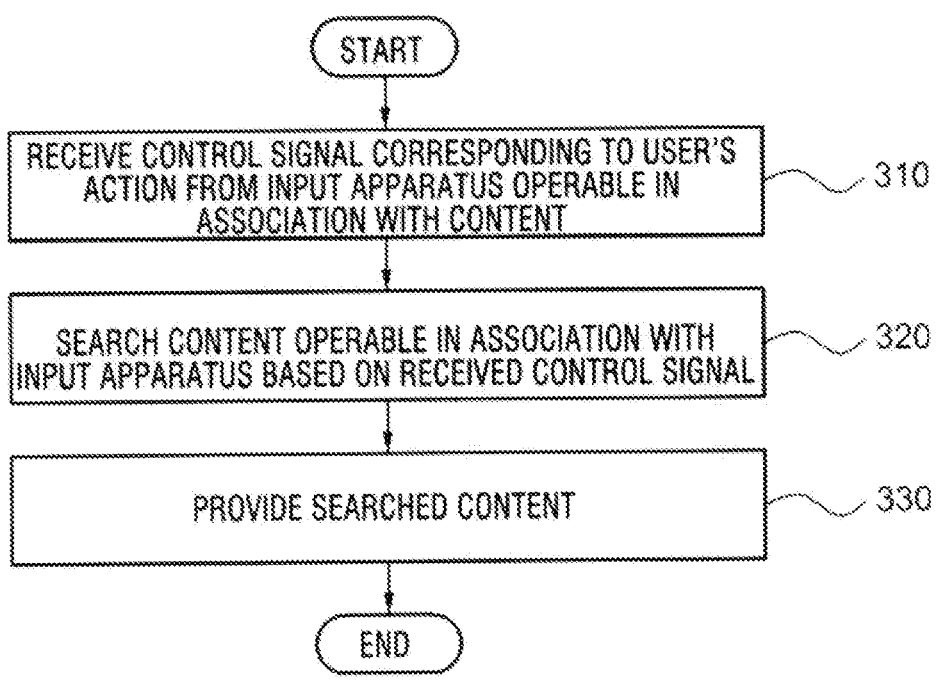
FIG. 3 is a flowchart illustrating a method for providing digital content according to an embodiment of the present invention.
Figure 4:
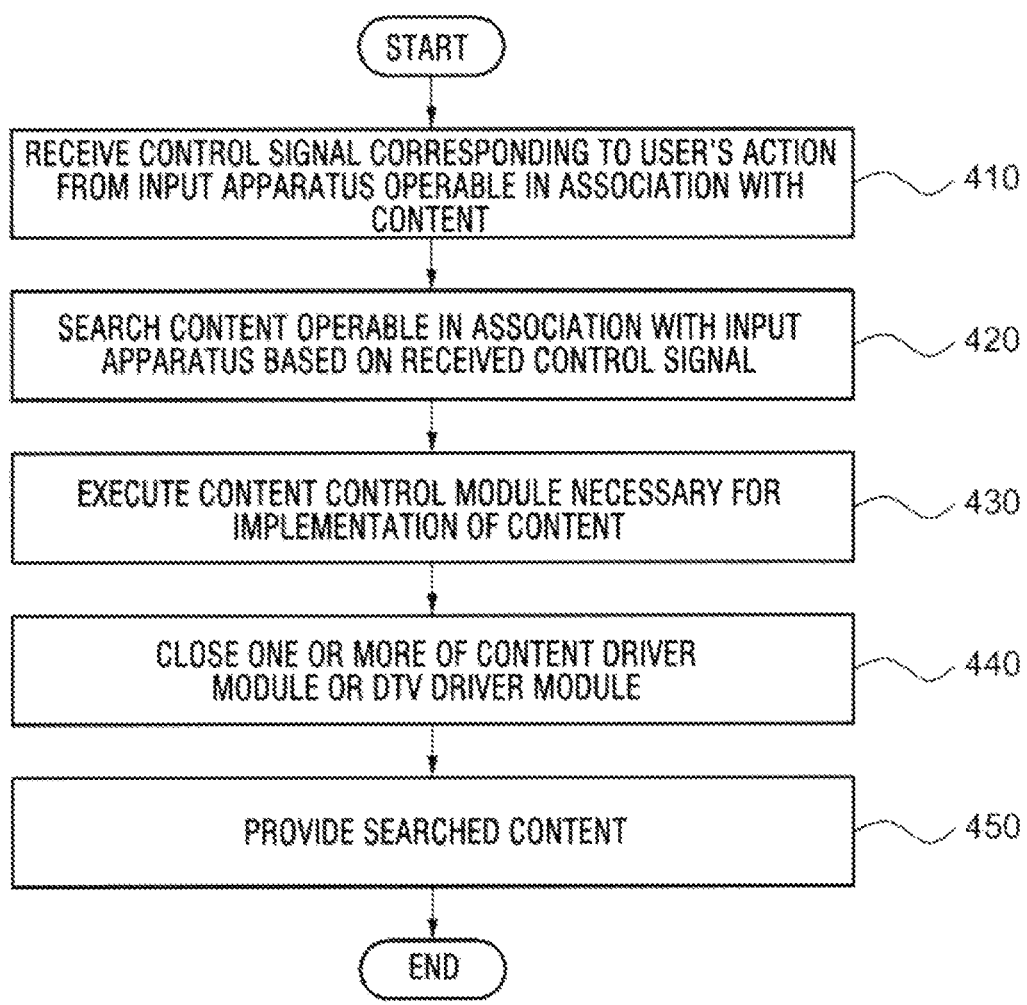
FIG. 4 is a flowchart illustrating a method for providing digital content according to an embodiment of the present invention.

Referring to FIGS. 3 and 4, a method for providing digital content in the digital content providing apparatus 100 construed as explained above will be explained below.

FIG. 3 is a flowchart illustrating a method for providing digital content according to an embodiment. The method of FIG. 3 may be implemented by the digital content providing apparatus 110.

In step 310, the digital content providing apparatus 110 receives a control signal corresponding to an action of a user from the input apparatus 120 operable in association with content.

The control signal may be at least one of the identifier information of the input apparatus, the sensor value varied and measured at the input apparatus, the action of a user information acquired based on the sensor value, and device control information acquired based on the action of a user information.

The identifier information may distinguish the input apparatus from another input apparatus or represent several functions in the input apparatus.

The varied sensor value is obtained as a result of the users' operating specific functions using the input apparatus, which may represent chemical or physical changes made in accordance with the action of a user.

For instance, if the input apparatus 120 is bar type and if a user grips the input apparatus, the input apparatus may measure the varied sensor values of time, pressure, temperature and motion regarding an action of a user by utilizing a grip sensor, a touch sensor, a temperature sensor, a terrestrial magnetism sensor, an acceleration sensor, a pressure sensor or the like.

Examples of an action of a user utilizing a bar type of the input apparatus may include shaking, grasping, upper hitting, lower hitting, throwing, tilting, holding up, or drawing, and the input apparatus may measure the varied sensor values from the above an action of a user.

In another example, if the input apparatus 120 is drum type and if a user knocks the input apparatus, the input apparatus may measure the sensor value of time, pressure or counting regarding the action of a user by utilizing a touch sensor, a pressure sensor, or a vibration sensor.

Examples of an action of a user utilizing a drum type input apparatus may be knocking, pushing, moving, shaking, or tilting, and the input apparatus may measure the varied sensor value according to the action of a user.

The action of a user information may be acquired by analyzing intentions of user utilizing the input apparatus based on the varied sensor value explained above.

For example, acquiring the action of a user information may include utilizing a table mapping user information corresponding to the varied sensor value. The varied sensor value applies as the input information, and an action of a user information corresponding to the varied sensor value applies as the output information.

Another example is to apply the varied sensor value to various types of machine learning engines to acquire the corresponding an action of a user information.

For example, if the input apparatus 120 is bar type and if a user grips the input apparatus for predetermined time, the input apparatus may apply a sensor value varied by the action of a user to the table or the engine and acquire the action of a user information indicative of the user's gripping the input apparatus, or the like.

Examples of the action of a user information which can be acquired by the bar type of the input apparatus 120 may include shaking, grasping, upper hitting, lower hitting, throwing, tilting, holding up, or drawing in the air.

In another example, if the input apparatus 120 is drum type and if a user knocks the input apparatus, the input apparatus may apply the sensor value varied by an action of a user to the table or the engine. Thus, an action of a user information indicative of user's knocking on the input apparatus may be acquired.

Examples of the action of a user information, which can be acquired by the drum type of the input apparatus 120 may include knocking, pushing, moving, shaking, or tilting.

The device control information acquired based on the action of a user information controls the digital content providing apparatus. Examples of device control information may be selecting, starting, deleting, moving, or copying content. The device control information may control functions of the digital content providing apparatus such as controlling volume, screen, brightness, and channel.

The device control information may be acquired by utilizing a table mapping the device control information corresponding to the action of a user information. The action of a user information may apply as the input information, and the output information may be the device control information corresponding to the action of a user information. Moreover, an action of a user information may be input as input information to various types of machine learning engines to acquire the device control information corresponding to the action of a user information.

If a user grips the bar type of the input apparatus for predetermined time, the input apparatus may acquire an action of a user information based on the sensor value varied by gripping. The input apparatus may acquire the device control information regarding controlling content or content providing apparatus corresponding to gripping information by applying the action of a user information to the mapping table or the machine learning engine.

The device control information acquired according to types of the input apparatus can be more easily utilized compared to pressing buttons of a remote control unit to operate the digital content providing apparatus. Since the remote control unit has more buttons and functions combined by the buttons, controlling the apparatus according to types of the input apparatus enables a user who does not use a remote control unit often to control the apparatus more conveniently. A child or a senior citizen, who have rarely used digital devices, needs to select several steps on the DTV menu with a remote control unit to view content. If motions of the input apparatus 120 illustrated in FIG. 1 are set to operate in association with playing digital content, the child or senior may go to the access point of the digital content more conveniently. For instance, if a user grips the input apparatus for predetermined time, the input apparatus 120 may determine that the user's intention is to play back content and transmit the control signal to the digital content providing apparatus 110, thereby immediately playing back the content.

The control signal corresponding to the action of a user transmitted from the input apparatus may be received from an external device. The external device, separated from the digital content providing apparatus, may be connected by wire or connected by a wireless network. For instance, the external device may be a set top box, a gateway unit, a memory stick, or a multimedia card.

The external device may receive control signal corresponding to an action of a user from the input apparatus operable in association with content, and search the digital content providing apparatus operable in association with the input apparatus based on the received signal. The external device may transmit the control signal corresponding to the action of a user to the digital content providing apparatus providing the searched digital content. The digital content providing apparatus searched by the external device may include content or a content control module operable in association with the input apparatus, receive the control signal from the external device, and implement content associated with the input apparatus or a content control module regarding the content.

In step 320, the digital content providing apparatus 110 searches content associated with the input apparatus based on the control signal corresponding to the received action of a user.

In step 320, the digital content providing apparatus 110 may search content available to be provided by the digital content providing apparatus based on at least one of information such as identifier information of the input apparatus, the sensor value measured by the input apparatus, an action of a user information acquired based on the sensor value, and device control information acquired based on the action of a user information.

Content may include games, broadcasting programs, videos, music, images, audios, scent information, motion information, or an application.

The content may be operable in association with the input apparatus, and controlled by an action of a user utilizing the input apparatus. Each piece of content may be controlled in accordance with one input apparatus or a plurality of input apparatus.

If there are a plurality of contents operable in association with the input apparatus, the content list may be provided to select at least one content from the plurality of contents. All or part of the contents in the list may be operable in association with the input apparatus.

To search content, the digital content providing apparatus determines the power status of the digital content providing apparatus. That is, if the digital content providing apparatus is off, a module switching on the digital content providing apparatus may be included. The module switching on the digital content providing apparatus may be included in the digital content providing apparatus to switch the digital content providing apparatus on, and execute a content module or a DTV driver module.

The module switching on the digital content providing apparatus may be provided outside the digital content providing apparatus. The external device receiving a command to switch on the digital content providing apparatus may search the digital content providing apparatus including content associated with the input apparatus or a content control module. The external device may switch on the searched digital content providing apparatus, and execute the content module or the DTV driver module.

In step 330, the digital content providing apparatus 110 provides the searched content.

In step 330, if the digital content providing apparatus 110 includes a display, the digital content providing apparatus 110 provides the searched content to the display. The digital content providing apparatus may also provide the content to a display of other apparatus. Further, the digital content providing apparatus may provide content by transmitting or storing the searched content to other apparatuses. The digital content providing apparatus may provide content searched by a plurality of devices. Providing digital content may not be limited to the above embodiments, and can be modified or varied by one skilled in the art.

Figure 5:
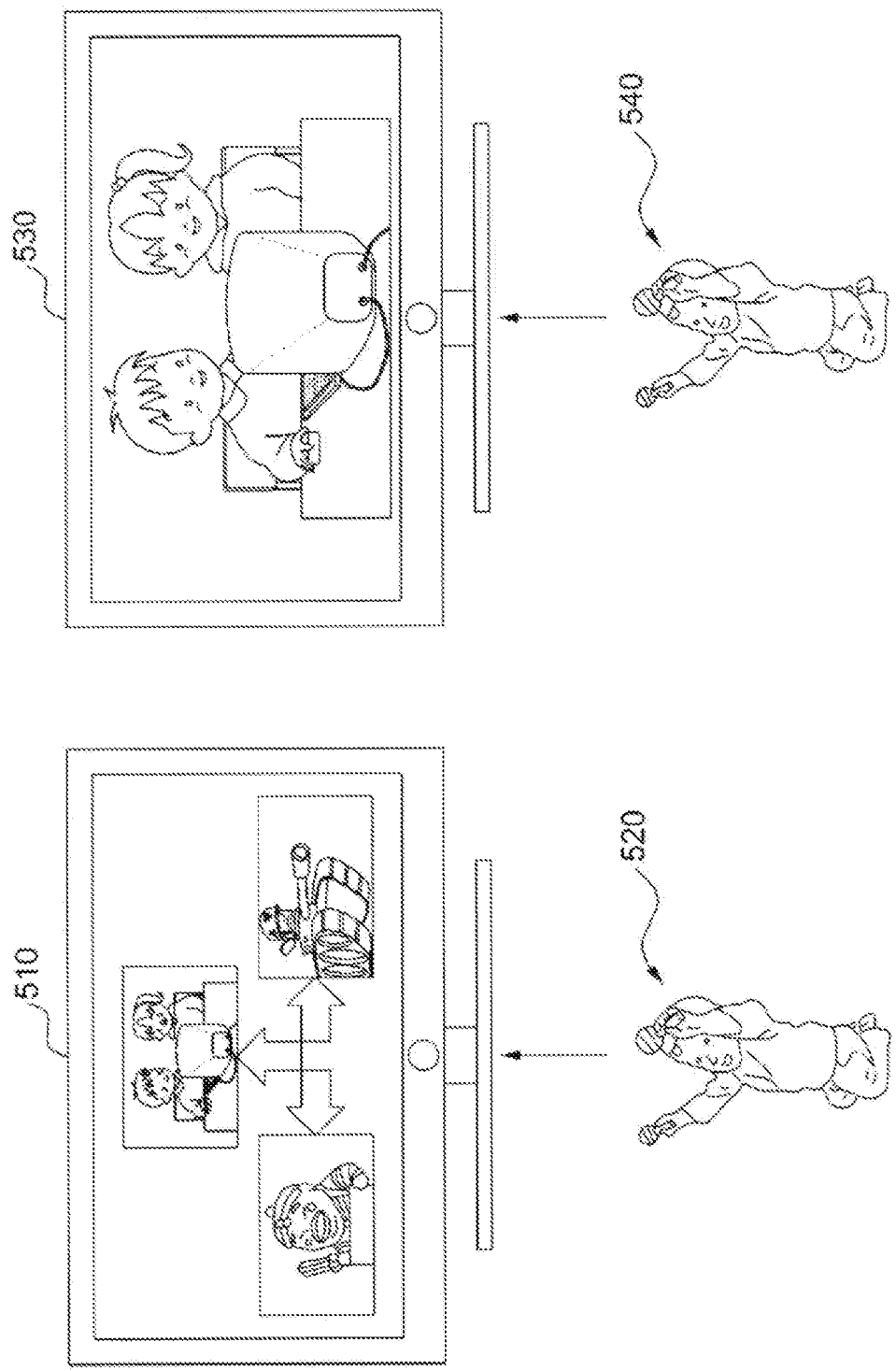
FIG. 5 illustrates an example in which a user operates a digital content providing apparatus according to an embodiment of the present invention.

If a plurality of digital contents are searched, an action of a user selecting content are illustrated in FIG. 5.

Referring to FIG. 5, a user 20 may select one content from a list of a plurality of contents by an action of a user utilizing the input apparatus of the present invention.

If the user 20 utilizes a bar type of the input apparatus, the user may move the bar type of the input apparatus rightward and leftward, or may knock it with respect to the plurality of contents on a screen of the digital content providing apparatus 10.

A control signal responding to the action of a user may be transmitted to the digital content providing apparatus, and the digital content providing apparatus may select content in need base on the control signal.

FIG. 4 is a flowchart illustrating a method for providing digital content according to another embodiment of the present invention. The method in FIG. 4 may be implemented by the digital content providing apparatus 110.

In step 410, the digital content providing apparatus 110 receives control signal corresponding to an action of a user from the input apparatus 120 operable in association with the content through the communication unit 116.

In step 440410, the control signal corresponding to the action of a user received from the input apparatus may be one of: identifier information of the input apparatus, sensor value varied and measured by the input apparatus, an action of a user information acquired based on the sensor value, and device control information acquired based on the action of a user information.

In step 420, the digital content providing apparatus 110 searches content associated with the input apparatus based on control signal corresponding to the received action of a user.

In step 420, the digital content providing apparatus 110 may search content available to be provided based on at least one control signal of information based on the identifier information of the input apparatus, the sensor value varied and measured by the input apparatus, the action of a user information acquired based on the sensor value, and the device control information acquired based on the action of a user information.

In step 430, the digital content providing apparatus 110 may execute a content control module providing content operable in association with the input apparatus.

In step 430, the content control module is implemented to provide content, and corresponds to the content or the input apparatus. One content control module may correspond to one or a plurality of content or input apparatus types.

In step 440, the digital content providing apparatus 110 closes at least one content drive module or DTV drive module.

In step 440, the digital content providing apparatus 110 may receive a control signal corresponding to an action of a user received from the input apparatus, execute a content control module corresponding to the input apparatus, and provide content operable in association with the input apparatus. The digital content providing apparatus may close at least one implementation of content control modules or DTV driver modules having less relationship with the content control module corresponding to the input apparatus. Before closing the content control module or the DTV driver module, the digital content providing apparatus 110 may additionally provide a menu or a pop-up to confirm such closing.

FIG. 6 illustrates an example in which a user operates a digital content providing apparatus according to an embodiment of the present invention.

Referring to FIG. 5, if a user 620 executing a content control module or a DTV drive module of the digital content providing apparatus 610 wants to access the content by utilizing a bar type of the input apparatus, the user 620 transmits control signal corresponding to an action of a user to execute the new content by gripping the bar type of the input apparatus for predetermined time to the digital content providing apparatus 610.

The digital content providing apparatus 630 may receive the control signal corresponding to the action of a user from the bar type of the input apparatus, and may close a currently-executed DTV drive module. The digital content providing apparatus 630 may also execute a content drive module to control the content corresponding to the bar type of the input apparatus, and provide the content operable in association with the above bar type of the input apparatus.

Before providing the content operable in association with the input apparatus, the digital content providing apparatus 630 may additionally provide a menu or a pop-up confirming the providing.

The digital content providing apparatus 630 may also be implemented without closing the currently-executed content control module or DTV driver module. If the digital content providing apparatus supports play-back of a plurality of content control modules or DTV driver modules, the new content control module is implemented along with the previously-executed content control modules. The content control module may also be implemented with the corresponding content in the form of new window such as picture in picture, picture out of picture, or double window to the display.

The digital content providing apparatus 630 may play back the searched content on the display, but also on other devices. The digital content providing apparatus may transmit the searched content to another device or store the content.

Methods according to the embodiments of the present invention may be implemented in the form of program commands to be executed through a variety of computing means and recorded on a computer-readable medium. The computer-readable medium may include program command, data file, or data structure singularly or in combination. The program command recorded on said medium may be designed and constructed specifically for the embodiment, or those which are known and available among those skilled in the computer software area.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing a digital content of an apparatus for providing digital content, the method comprising:
receiving a control signal corresponding to an action of a user from an input apparatus associated with the content;
searching the content associated with the input apparatus based on the received control signal; and
providing the searched content,
wherein the control signal comprises:
identifier information of the input apparatus,
a sensor value varied and measured at the input apparatus,
user action information acquired based on the sensor value, and
device control information acquired based on the user action information,
wherein the content associated with the input apparatus is executed and controlled by the action of the user detected at an input apparatus identified by the identifier information,
wherein the action of the user is varied according to a type of input apparatus, and
wherein the device control information comprises information to control the apparatus for providing digital content.

2. The method of claim 1, wherein the control signal further comprises:
apparatus control information acquired based on the user action information.

3. The method of claim 1, wherein searching comprises:
switching on power of the apparatus for providing digital content, if power of the apparatus for providing digital content is in an off state.

4. The method of claim 1, wherein providing the searched content comprises:
providing a list of the searched content.

5. The method of claim 4, comprising:
receiving a control signal corresponding to a selection of at least one content from the searched content list.

6. The method of claim 1, further comprising:
displaying at least one of the provided content and information related to the content.

7. The method of claim 1, wherein the providing the searched content comprises:
executing a content controller module to provide the content.

8. The method of claim 1, wherein the providing the content comprises:
ending execution of at least one of a content controller module and a Digital Television (DTV) controller module.

9. A method for providing digital content, comprising:
receiving, at a first apparatus, a control signal corresponding to an action of a user from an input apparatus associated with the content;
searching a second apparatus operable in association with the input apparatus based on the received control signal; and
transmitting the control signal to the searched second apparatus,
wherein the external apparatus includes a content controller module operable in association with the input apparatus,
wherein the control signal comprises:
identifier information of the input apparatus,
a sensor value varied and measured at the input apparatus,
user action information acquired based on the sensor value, and
device control information acquired based on the user action information,
wherein the content associated with the input apparatus is executed and controlled by the action of the user detected at an input apparatus identified by the identifier information,
wherein the action of the user is varied according to a type of input apparatus, and
wherein the device control information comprises information to control the apparatus for providing digital content.

10. An apparatus for providing digital content, comprising:
a communication unit, which receives a control signal corresponding to an action of a user from an input apparatus associated with the content;
a control unit which searches a content associated with the input apparatus based on the received control signal; and
an output unit which provides the searched content,
wherein the control signal comprises:
identifier information of the input apparatus,
a sensor value varied and measured at the input apparatus,
user action information acquired based on the sensor value, and
device control information acquired based on the user action information,
wherein the content associated with the input apparatus is executed and controlled by the action of the user detected at an input apparatus identified by the identifier information,
wherein the action of the user is varied according to a type of the input apparatus, and
wherein the device control information comprises information to control the apparatus for providing digital content.

11. The apparatus of claim 10, wherein the control signal further comprises:
apparatus control information acquired based on the user action information.

12. The apparatus of claim 10, wherein the control unit switches on power of the apparatus for providing digital content, if power of the apparatus for providing digital content is in off state.

13. The apparatus of claim 10, wherein the control unit provides a list of the searched content.

14. The apparatus of claim 13, wherein the communication unit receives a control signal corresponding to at least one action of the user from the content list.

15. The apparatus of claim 10, further comprising:
a display which displays at least one of the provided content and information related to the content.

16. The apparatus of claim 10, wherein the control unit executes a content controller module to provide the content, if the content is provided.

17. The apparatus of claim 10, wherein if the content is provided, the control unit ends execution of at least one of a content controller module and a Digital Television (DTV) controller module.

18. An apparatus for providing digital content, the apparatus comprising:
a communication unit, which receives a control signal corresponding to an action of a user from an input apparatus associated with the content;
a control unit which searches an external apparatus operable in association with the input apparatus based on the received control signal; and
a transmitting unit which transmits the control signal to the searched second apparatus,
wherein the external apparatus includes a content controller module operable in association with the input apparatus,
wherein the control signal comprises:
identifier information of the input apparatus,
a sensor value varied and measured at the input apparatus
user action information acquired based on the sensor value, and
device control information acquired based on the user action information,
wherein the content associated with the input apparatus is executed and controlled by the action of the user detected at an input apparatus identified by the identifier information,
wherein the action of the user is varied according to a kind of input apparatus, and
wherein the device control information comprises information to control the apparatus for providing digital content.

19. A non-transitory computer-readable recording medium having stored thereon a program to execute a method, comprising:
receiving a control signal corresponding to an action of a user from an input apparatus associated with the content;
searching a content associated with the input apparatus based on the received control signal; and
providing the searched content, wherein the control signal comprises:
  identifier information of the input apparatus,
  a sensor value varied and measured at the input apparatus, user action information acquired based on the sensor value, and
  device control information acquired based on the user action information,
wherein the content associated with the input apparatus is executed and controlled by the action of the user detected at an input apparatus identified by the identifier information,
wherein the action of the user is varied according to a type of the input apparatus, and
wherein the device control information comprises information to control the apparatus for providing digital content.

20. The method of claim 1, wherein user action information is mapped to corresponding sensor values utilizing a table mapping function.

21. The method of claim 1, wherein, when the apparatus is a bar type apparatus, gripping by the user for a predetermined time measures one of time, pressure, temperature and motion regarding an action of the user utilizing one of a grip sensor, a touch sensor, a temperature sensor, a terrestrial magnetism sensor, an acceleration sensor, and a pressure sensor.

22. The method of claim 9, wherein the user action information is mapped to corresponding sensor values utilizing a table mapping function.

23. The apparatus of claim 10, wherein the user action information is mapped to corresponding sensor values utilizing a table mapping function.

24. The apparatus of claim 18, wherein the user action information is mapped to corresponding sensor values utilizing a table mapping function.

25. The non-transitory computer-readable recording medium of claim 19, wherein user action information is mapped to corresponding sensor values utilizing a table mapping function.

* * * * *